May 31, 1932.  H. A. BEILGARD  1,860,646
ICE CREAM CUTTING DEVICE
Filed Aug. 13, 1928  2 Sheets-Sheet 1
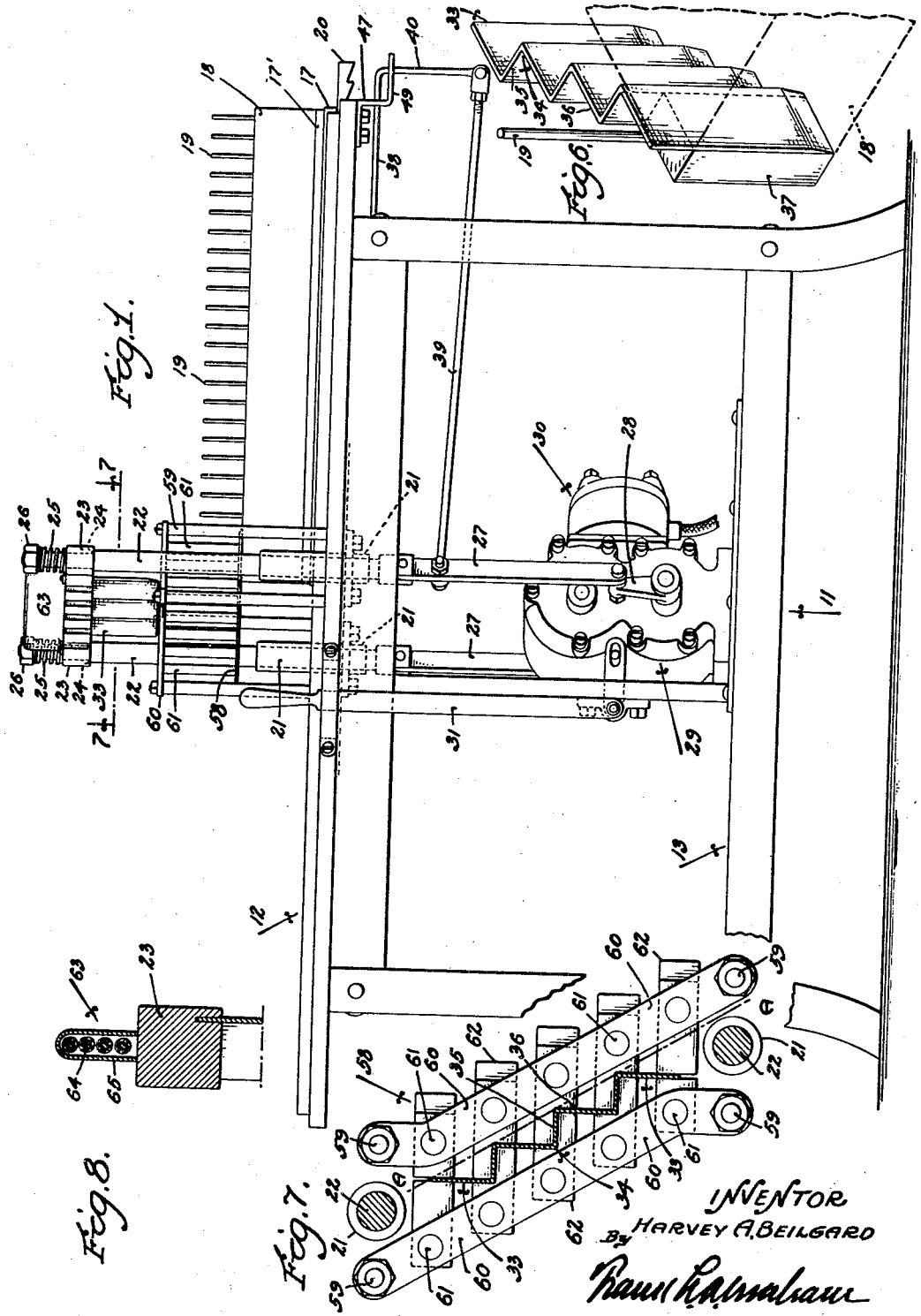
INVENTOR
HARVEY A. BEILGARD
ATTORNEY

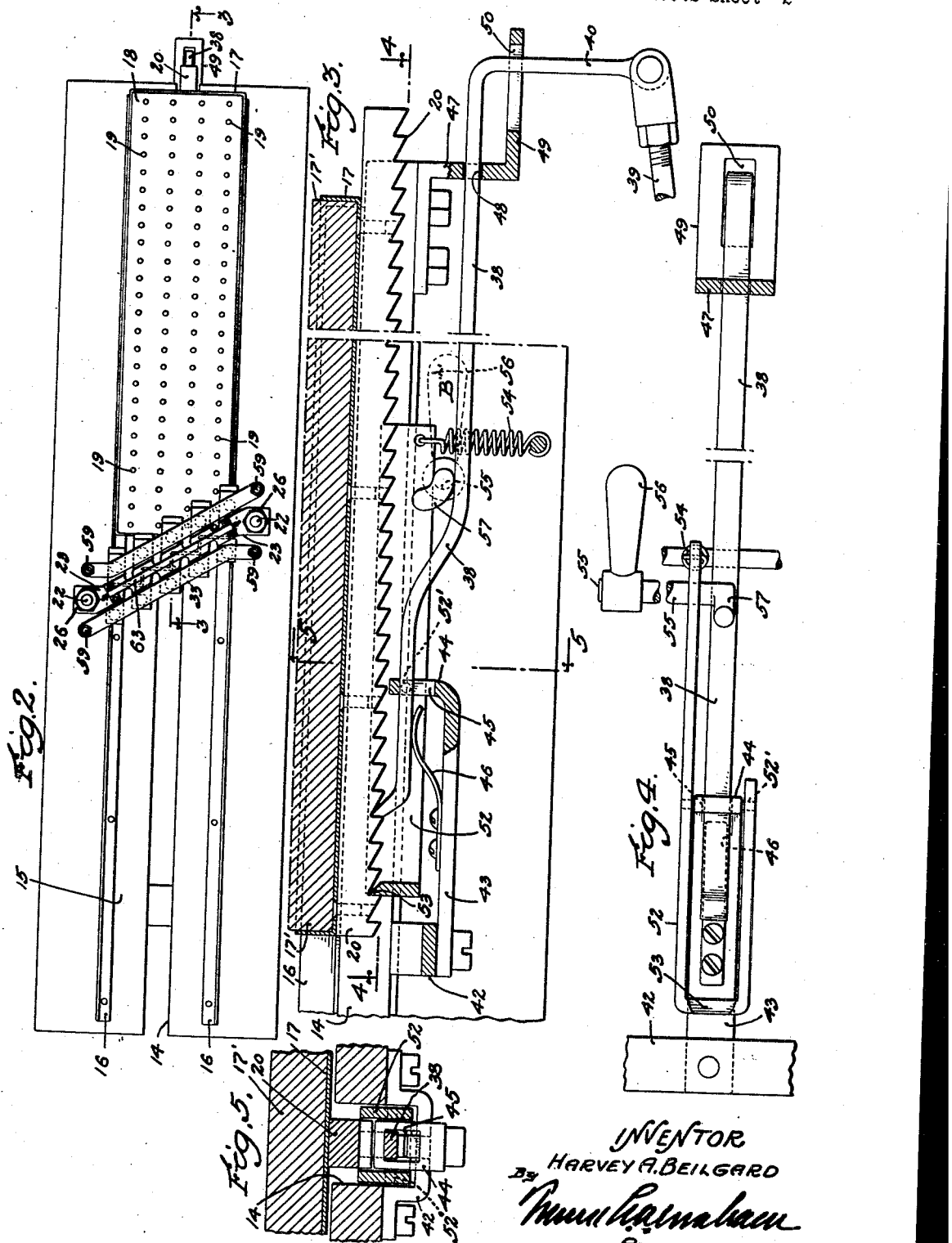

Patented May 31, 1932

1,860,646

UNITED STATES PATENT OFFICE

HARVEY A. BEILGARD, OF HOLLYWOOD, CALIFORNIA

ICE CREAM CUTTING DEVICE

Application filed August 13, 1928. Serial No. 299,293.

This invention relates to a device for cutting blocks or bricks of substantially solid substance, into a plurality of small individual units. The device has been produced especially for cutting ice cream on a commercial scale into small blocks which are provided with sticks and are subsequently dipped in chocolate or other suitable covering material in preparation for retail dispensation.

Due to its tenacious quality, ice cream is very difficult to handle and to cut by means of machinery. Various devices have been constructed and used with limited success, such devices including various arrangement of wires, oppositely reciprocating blades and blades in the form of dies but none of these devices have been successful, and due to the loss in material and the non-uniformity of the units produced, such devices have met with little favor among the trade.

My invention depends largely for its novelty and utility upon a specially constructed stepped blade which is adapted to completely sever individual units or blocks from the main brick of ice cream during each vertical movement of the cutting element relative to the mentioned brick.

The invention also embodies novel means for imparting reciprocation to the blade which cooperates with additional means for advancing the brick of ice cream relative to the blade and in synchronism with its reciprocation.

The invention also embodies scraping means for removing the frost or ice cream, which tends to cling to the blade.

It therefore follows that a fundamental object of this invention is the production of a device of simple form and construction having a stepped blade for use in cutting ice cream or the like, which comprises a plurality of cutting units arranged at right angles with each other, and forming cutting corners which lie in a common diagonal plane.

It is a further object of the invention to develop a machine adapted to reciprocate such a blade and to advance in a plane transverse with the direction of said reciprocation, a block of ice cream or similar material which is to be cut.

It is a still further object of the invention to produce a blade of the class described which is heated electrically during the operation of the machine and which is provided with scraping means adapted to keep the cutting surfaces of the blade clean at all times.

Other objects and advantages of this invention will be better understood from the following description of the accompanying drawings which are chosen for illustrative purposes only and in which Fig. 1 is an elevational view showing one embodiment of my invention.

Fig. 2 is a plan view illustrating the embodiment of my invention shown in Fig. 1.

Fig. 3 is a partial sectional elevation taken substantially in a plane represented by the line 3—3 in Fig. 2 and showing the mechanism used in advancing a plate which carries the material being cut by the machine.

Fig. 4 is a partial plan section taken substantially in a plane represented by the line 4—4 in Fig. 3.

Fig. 5 is a partial elevational section taken substantially in a plane represented by the line 5—5 in Fig. 3.

Fig. 6 is a perspective view showing the construction of the stepped blade used in this invention and illustrating the manner in which this blade severs the individual blocks or units in the cutting operation.

Fig. 7 is an enlarged partial plan section taken substantially in a plane represented by the line 7—7 in Fig. 1 showing the relative arrangement of the blade and the scraping members.

Fig. 8 is an enlarged partion sectional elevation illustrating the manner of supporting the stepped blade and showing the arrangement of a heating element thereon.

More particularly describing the invention as herein illustrated, reference numeral 11 indicates a table having a top 12 and a lower platform 13.

The top of the table is divided to form a central channel or passage 14 and is upwardly provided with a groove or guide track 15, formed by two oppositely disposed and substantially parallel flanges 16.

The guide track 15 is adapted to slidably support a substantially rectangular plate 17 having a board or block 17' mounted thereon which carries a block of ice cream 18. The ice cream is optionally provided with a plurality of upwardly extending sticks 19, which are arranged in equally spaced rows thereon, and are adapted to provide means for handling each of the individual blocks after they have been severed from the main brick.

The lower surface of the plate 17 is provided with a downwardly extending rack 20 which is received by the central passage or channel 14 in the top of the table and is adapted to be used in advancing the plate as will be hereinafter described.

The table top 12 is centrally provided with a pair of diagonally opposite standard guides, indicated by reference numeral 21 which receive reciprocable standards 22, the upper ends of the standards being adapted to support opposite ends of a diagonal blade supporting bar or head 23.

The blade supporting head 23 is held against downward movement upon the reciprocable standards by means of suitable shoulders which are indicated at 24 and is retained against upward movement thereon by means of the springs 25 which are downwardly pressed upon the head 23 through engagement with nuts 26.

As is best illustrated in Fig. 1, the reciprocable standards 22 extend below the table top 12, where they are attached to the upper ends of links 27, the links in turn being downwardly pivoted upon cranks 28, which are rotated in any suitable manner such as by means of the reduction gear 29, which is mounted upon the platform 13. The reduction gear is adapted to be driven by a motor and a suitable control lever 31 is provided for the purpose of governing the operation of the motor and the reduction gear.

The lower edge of the blade supporting head 23 carries a stepped blade 33, the construction of which is best illustrated in Figs. 6 and 7.

The blade 33 is preferably made from a single flat metal plate which is bent to form a plurality of sections 34, the sections comprising lateral and transverse members 35 and 36 respectively. The members 35 and 36 are arranged at right angles to each other and form open corners, which lie in the common diagonal plane indicated by the dot and dash lines A—A in Fig. 7.

It will be understood that when the motor 30 is in operation, the crank 28 will be rotated and the blade 33 will be reciprocated by means of the standards 22 and the connecting links 27. This reciprocation is in a plane which is substantially at right angles to the plane of the plate 17 and it will also be apparent that if the brick of ice cream indicated at 18 is advanced to the position indicated by the dot and dash lines in Fig. 6, that the downward movement of the blade 33 will be effective to completely sever an individual block 37 from the brick 18. If the brick 18 is then advanced in individual steps which correspond in length to the width of one of the transverse members 35, during the reciprocation of the blade, the brick will be divided into a plurality of individual units such as that indicated by reference numeral 37 in Fig. 6.

For the purpose of effecting the advance of the brick 18, the plate 17 has been provided with the ratchet 20 and a ratchet engaging pawl 38 is supported beneath the channel or passage 14 in the table and is adapted to receive reciprocation from a laterally extending connecting rod 39 which is interposed between one of the links 27 and a downwardly extending arm 40, formed on the outer end of the pawl member 38.

The construction of the pawl member 38 and its means of support are best illustrated in Figs. 3 and 4 in which a transverse bar member 42 mounted on the lower surface of the table is illustrated as supporting a laterally extending arm or finger 43 which has an upward projection 44 outwardly formed thereon. The projection 44 is provided with an aperture 45 which receives the pawl member 38.

A spring 46 is mounted upon the upper face of the arm 43 and engages a lower face of the pawl member 38, holding the same in yieldable engagement with the ratchet surface of the rack member 20.

A guide arm 47 is mounted upon the outer end of the table 14 and is provided with a lateral passage 48 which slidably receives an outer portion of the pawl arm 38. The arm 47 is also provided with an angle extension 49 which in turn contains a transverse passage 50 which acts as a guide for the downwardly extending arm 40 on the pawl member.

The connecting rod 39 is so adjusted relative to the arm 40 and the link 27 as to effect the forward movement of the plate 17, while the blade 33 is substantially in the position shown in Fig. 1. This movement is equal in distance to the width of one of the transverse members 35 in the blade.

In order that the plate 17 may be held in place during the cutting movement of the blade, an arm 52 which is pivoted at 52' in the upwardly extending projection 44 on the finger 43, is provided with a transverse ratchet engaging section 53 and is held in yieldable engagement with rack 20 by means such as the coil spring 54, as is best illustrated in Figs. 3 and 4.

Means are also provided for optionally rendering the pawl member 38 inoperable, such means embodying a transverse rotatable shaft 55 outwardly provided with a handle 56 and inwardly provided with a cam finger 57 which engages the pawl member 38. It will be understood from the illustration in Fig. 3, that the upward movement of the handle 56 in the direction of the arrow B, will be effective to force the pawl 38 down and out of engagement with the rack 20.

In order that the blade may be scraped clean of frost and ice cream during the withdrawal from the brick 17, and further to prevent a cracking or lifting of the ice cream which surrounds the blade during the mentioned withdrawal, a plurality of scraping members, generally indicated by reference numeral 58, are supported upon the table 14 by means of oppositely disposed fixed standards 59. These scraping members embody a pair of diagonal supporting bars 60 which are mounted upon the standards 59 and the bars support a plurality of downwardly extending legs 61, the lower ends of which are provided with scrapping shoes 62.

The arrangement of the scraping shoes is best illustrated in Fig. 7 in which it will be noted that the shoes are spaced from one another in a manner which will permit the passage therebetween of the sticks 19. These shoes are preferably arranged so that the lower surface of each shoe is in engagement with the upper surface of the brick 18, and they are thus effective to prevent the upward movement of any of the ice cream during the withdrawal of the blade.

In order that the machine may be more rapidly and positively operated it is preferable to provide the blade with some means of raising its temperature above that of the ice cream in which it is being operated and for this purpose a heating element indicated by reference numeral 63 is provided upon the upper surface of the blade supporting head 23.

This element which may be of any preferred form is illustrated as comprising a plurality of electric resistance wires 64 which are enclosed within a shield or housing 65.

It will be apparent from the foregoing description that this invention embodies a machine which may be effectively used to cut any substantially solid brick of material into a plurality of unit blocks and in which each of the blocks is completely severed from the main brick during one cutting movement of the blade. This feature which is a result of the stepped blade is particularly desirable in cutting ice cream and similar substances which are difficult to cut.

It will be understood that while I have herein described one complete embodiment of the invention, that it is not limited to the precise construction, or combination of elements set forth in the illustrations but includes within its scope such changes as may fairly come within the spirit of the appended claims.

I claim as my invention:

1. For use in cutting an edible brick having a plurality of spaced upstanding sticks inserted in the upper surface thereof, a cutting machine embodying: a table having a guide formed on top thereof; a plate in said guide adapted to support said brick; reciprocable standards oppositely mounted on said table; a head member mounted on said standards; a stepped cutting blade mounted in said head member; means for moving said plate in a plane transverse with the plane of said blades; means for reciprocating said standards so that the lower edge of said blade at its uppermost position clears said sticks; fixed standards on opposite sides of said reciprocating standards; a beam member supported by each pair of fixed standards; a plurality of downwardly projecting legs on said beam members; and scrapers on said legs adapted to engage the stepped sections of said blade and spaced apart so as to permit the passage of said sticks therebetween.

2. For use in cutting small blocks each having an upstanding stick therein from an edible brick, a cutting machine embodying: a table having a guide formed on top thereof; a plate in said guide adapted to support said brick; reciprocable standards oppositely mounted on said table; a head member mounted on said standards; a cutting blade mounted in said head member, said blade being shaped so as to cut blocks from said brick; means for reciprocating said standards so that the lower edge of said blade at its uppermost position clears said sticks; fixed standards adjacent said reciprocating standards; a beam member supported by said fixed standards; a plurality of downwardly projecting legs on said beam member; and shoes on the lower ends of said legs adjacent said brick and said blade, said shoes and said legs being spaced apart so as to permit the passage of said sticks therebetween.

In testimony whereof, I have hereunto set my hand at Los Angeles, California, this 3rd day of August, 1928.

HARVEY A. BEILGARD.